Oct. 18, 1966  J. O. PRATT ETAL  3,279,021
CONCRETE PRODUCTS MACHINE
Filed Sept. 26, 1963  10 Sheets-Sheet 1

INVENTORS.
J. O. PRATT
H. B. RUNKLE Sr.
BY
Robb & Robb
attorneys

INVENTORS.
J. O. PRATT
H. B. RUNKLE
BY Robb+Robb
attorneys

Oct. 18, 1966    J. O. PRATT ETAL    3,279,021
CONCRETE PRODUCTS MACHINE
Filed Sept. 26, 1963    10 Sheets-Sheet 4

INVENTORS.
J. O. PRATT
H. B. RUNKLE Sr
BY Robb & Robb
 Attorneys

Oct. 18, 1966  J. O. PRATT ETAL  3,279,021
CONCRETE PRODUCTS MACHINE
Filed Sept. 26, 1963  10 Sheets-Sheet 5

INVENTORS.
J. O. PRATT
H. B. RUNKLE, SR.
BY
Robb & Robb
attorneys

Oct. 18, 1966
J. O. PRATT ETAL
3,279,021
CONCRETE PRODUCTS MACHINE
Filed Sept. 26, 1963
10 Sheets-Sheet 8
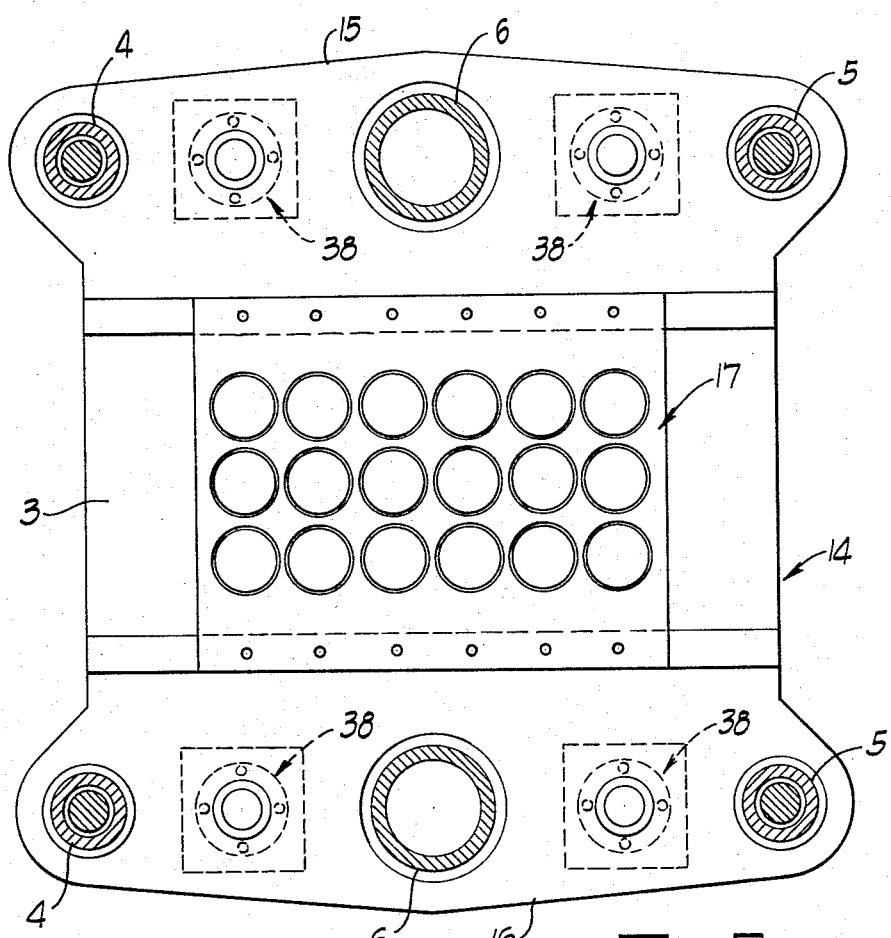
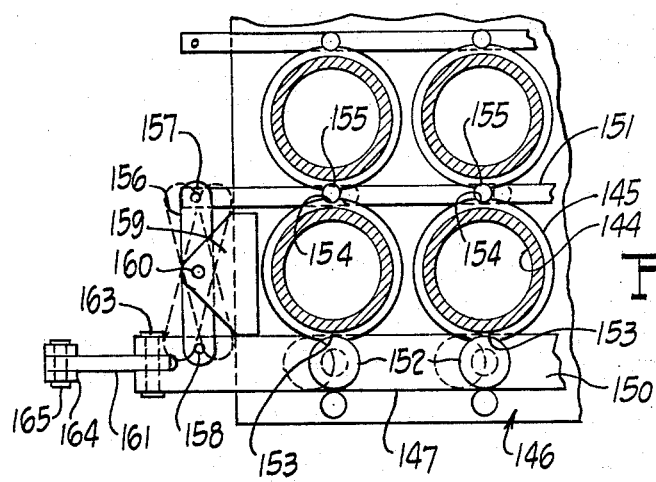
INVENTORS.
J. O. PRATT
H. B. RUNKLE JR
BY
Robb & Robb
attorneys

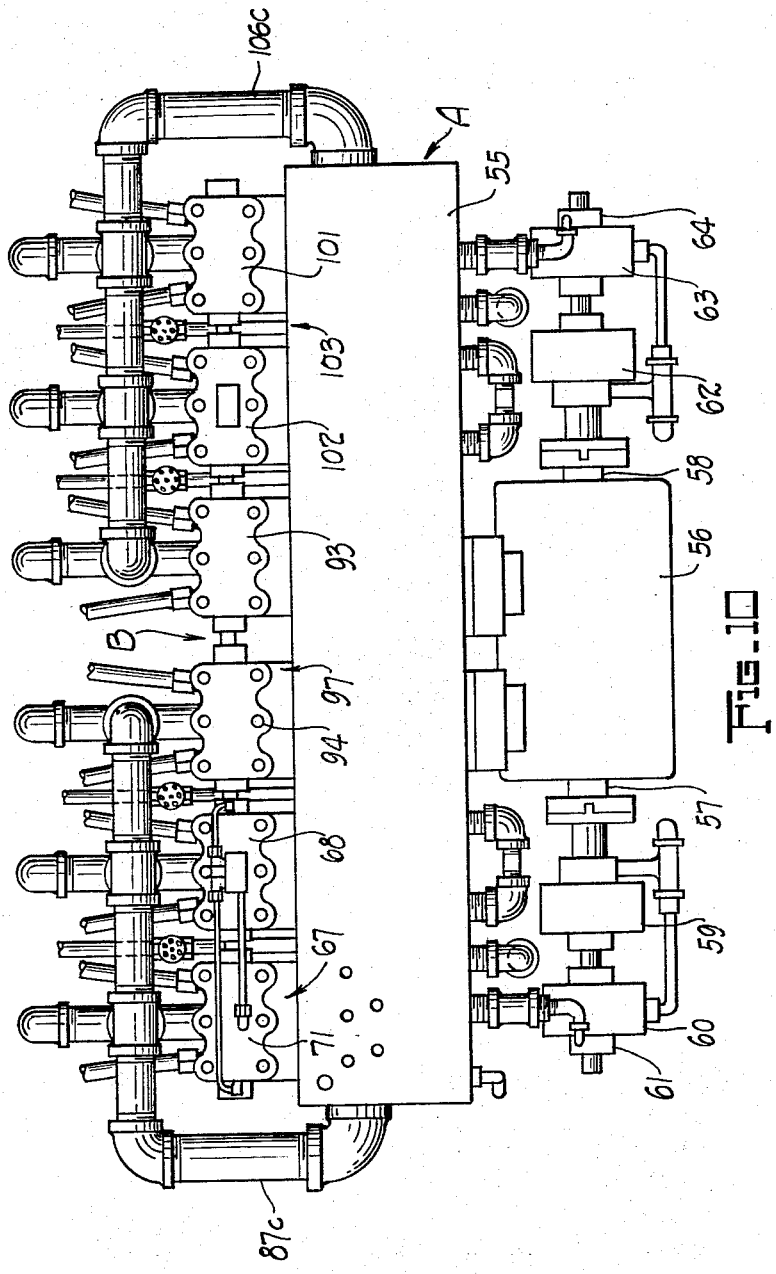

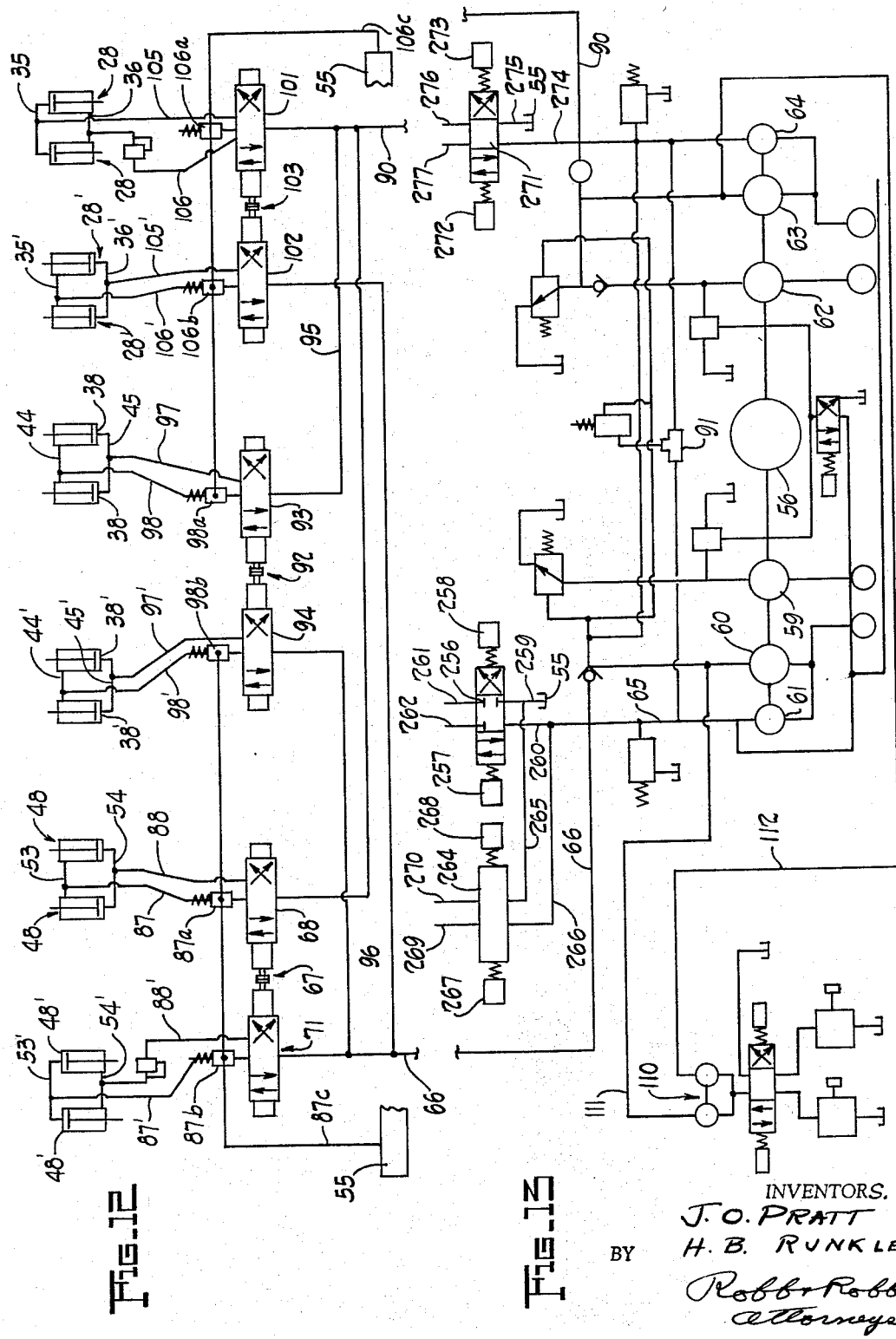

United States Patent Office 3,279,021
Patented Oct. 18, 1966

3,279,021
CONCRETE PRODUCTS MACHINE
James Orville Pratt, R.R. 1, Box 2, Fort Recovery, Ohio,
and Henry B. Runkle, Sr., Union City, Ohio; said
Runkle assignor to said Pratt
Filed Sept. 26, 1963, Ser. No. 311,847
16 Claims. (Cl. 25—45)

This invention relates to pressing or forming machines, and primarily to a machine which is aptly described as a triple action press.

While the machine has been primarily designed to provide for the manufacture of concrete products or products made of similar material which is susceptible of handling in bulk and being formed into solid or other shapes, it also finds very important applications in other types of industries such as in the metal forming or metal working art.

Dealing initially with the field of concrete products, it is pointed out that whereas heretofore products of any particular description and as an example concrete tile, have been made in machines which require vast amounts of labor in handling the material both into and from the machine and the problem of multiple forming, that is forming more than one piece at a time has never been solved in a satisfactory manner.

While costs of materials and the labor involved in forming the same have continued to increase, no comparable increase in the rate of production of the various items such as tile or block or other shapes of concrete products has taken place and necessarily such increase must revolve around providing equipment which will increase production without increased labor connected therewith.

With the foregoing general contemplation in mind, the broadest contemplation of the instant invention is to be able to form the concrete products as to that phase of the use of the machinery in multiples, in the shortest possible time and with improved characteristics as results herefrom.

The concept involved herein, resides in the provision of a machine which will produce concrete products specifically at a rate which has been completely beyond the capacity of prior known machines and as an incidental but very important result, provide better products than have heretofore been possible under any conditions.

A most important advance afforded by the instant invention is that the machine, in which the concrete products are made and around which the machine was essentially designed, can also be used for metal forming or in other industries in which material which is related in form to concrete is also handled, such as the fiber or plastic industry.

Having outlined several broad phases of the general concept herein, specific advances resulting from this invention, reside in providing a machine in which a series of rather complex movements may be caused to take place, in any sequence desired with terrific pressures being available to form or compact materials being worked thereby with rapidity of action being one of the prime accomplishments hereof.

A specific object of this invention is to provide a machine of the press type in which a series of forming support members are arranged so that they can manipulate materials supplied to the machine and by automatic action form those materials into the desired final products having improved characteristics and with the necessary rapidity to decrease costs in all respects.

A further object of this invention is to provide a machine of the class described, in which a sequence of operations may be performed to provide a final product, with automatic succession of the operations being effected and availing of pressures provided by hydraulic means as contrasted with mechanical means and/or other instrumentalities of like nature.

Yet a further object of this invention is to provide a machine of the class described in which the same occupies a minimum amount of floor space, being essentially a vertical arrangement of operating parts, said machine including spaced column and support members and which is further arranged in a substantially symmetrical manner for purposes which will be explained in detail and primarily to facilitate increased capacity with certain basic elements remaining the same.

A still further object of this invention is to provide a machine in which pressing and forming operations may be accomplished, which is of suitable construction to form a large number of objects at the same time, whether the same be of concrete or other material, to supply the material to the machine in continuous manner, produce the parts or products therewithin likewise, all under coordinated automatic operation and with substantial pressures being available therefor.

Another object of this invention is to provide a machine of the class described which includes parts forming the same which are arranged and formed in pairs themselves or in multiples thereof, whereby the cost of the machine is maintained at a relatively reasonable figure and yet the ability of the machine to accomplish the ends sought is even better facilitated because of the compactness thereof and the hydraulic nature of the instrumentalities availed of to manipulate the same.

An important object of this invention is the novel hydraulic control mechanism which provides for the simultaneous movement of the various hydraulic instrumentalities with a precision and nicety not heretofore known in machines of the class described.

A further important object of this invention is to provide hydraulic mechanism which is capable of controlling the pressure exerted in hydraulic piston and cylinder units with a degree of uniformity desirable and necessary in machines of the class to which this invention is directed.

Other objects and advantages of the invention will be understood from a consideration of the specification appended hereto and disclosed in the drawings wherein:

FIGURE 8 is a fragmentary sectional view taken about on the line 8—8 of FIGURE 5 looking in the direction of the arrows, to illustrate certain operating instrumentalities.

FIGURE 9 is a horizontal sectional view taken about on the line 9—9 of FIGURE 7 looking in the direction of the arrows.

FIGURE 10 is a top plan view showing the hydraulic pump, tank and valving arrangement to supply power and operating means for the various press parts.

FIGURE 11 is a sectional view of certain of the valves and the operating connection thereof one with the other.

FIGURE 12 is a partial piping diagram of the hydraulic instrumentalities, illustrating the flow of hydraulic oil to and from the hydraulic cylinders.

Figure 1:
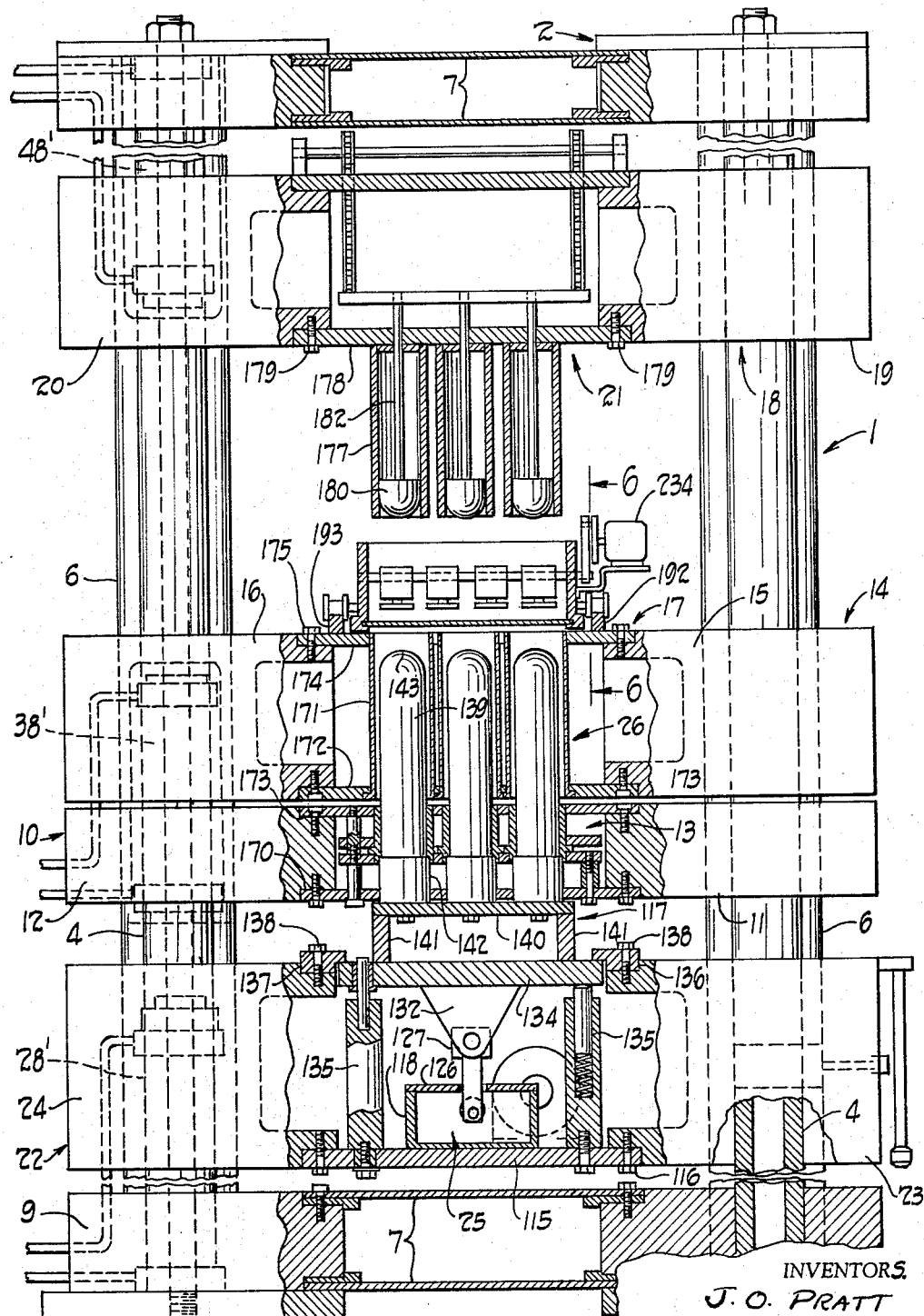
FIGURE 1 is a front view, somewhat fragmentary in nature, and partly in section illustrating the general arrangement of many essential elements of the invention and one position of the same in operating condition.
Figure 2:
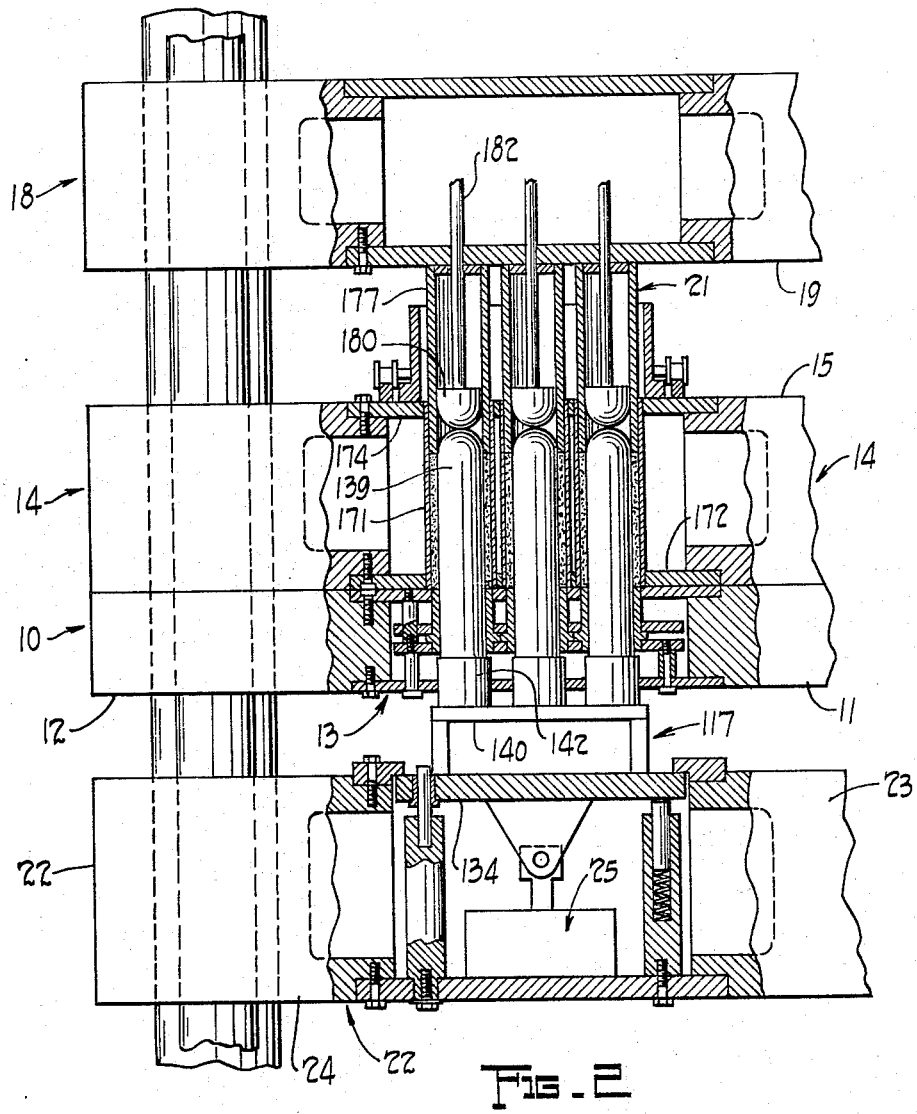
FIGURES 2, 3 and 4 are fragmentary views of sections of FIGURE 1, illustrating other positions of various of the instrumentalities, largely in section and fragmentary likewise.
Figure 3:
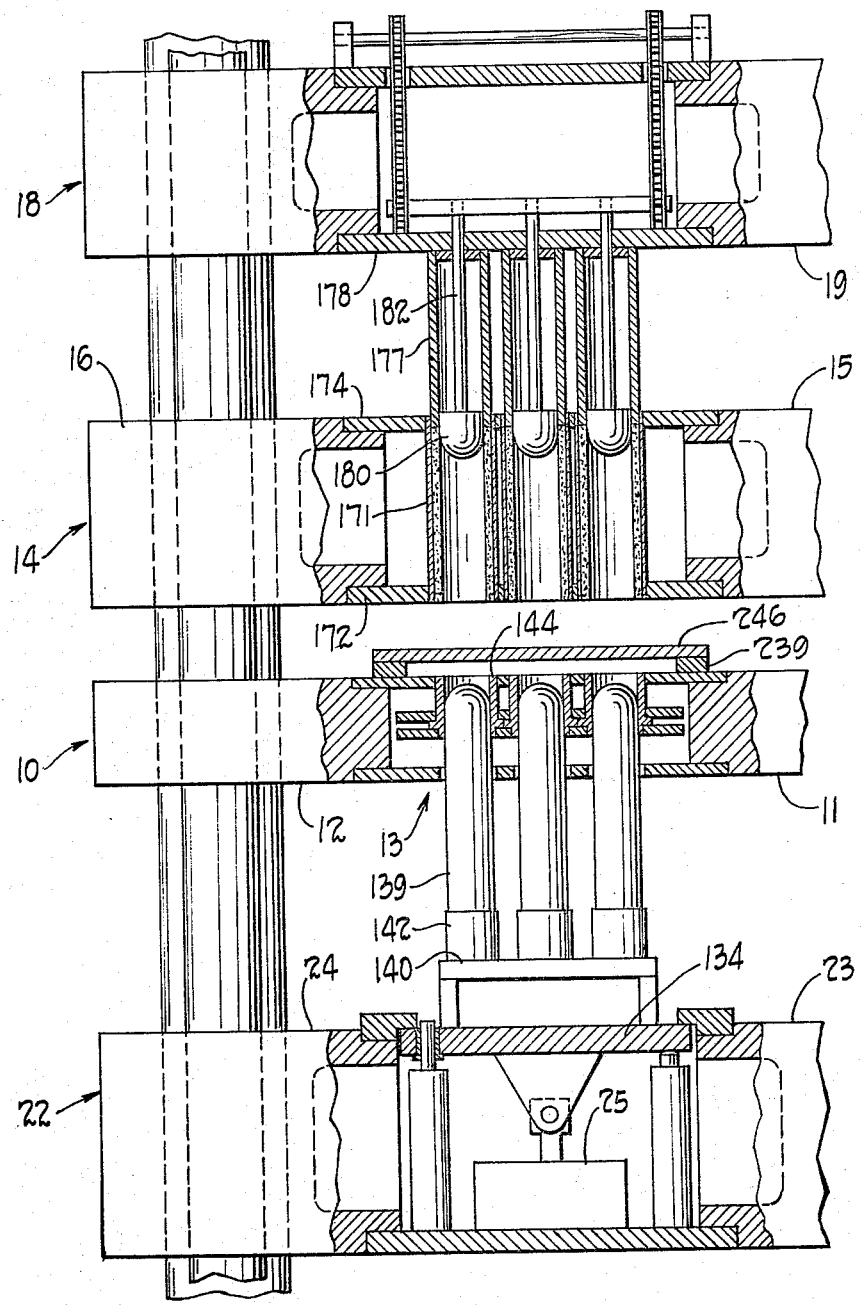

FIGURE 13 discloses the balance of the hydraulic circuit and diagrammatically indicates other instrumentalities.

Referring now to FIGURES 1, 5, 7, and 9 initially, it is noted that the press hereof is comprised of a main frame generally denoted 1, consisting of a top member 2 and a bed member 3 which are in turn connected by column means such as the column parts 4 and 5 of substantially identical formation with a main column 6 for each side of the press. The press as a whole is symmetrical and purposely so, in order to facilitate the expansion of the press in width by means of substituting different length of members as for example the members 7 in FIGURE 1, so as to space the columns farther apart and thereby provide for additional capacity of the press.

The symmetrical nature of the press, is emphasized by a consideration of FIGURE 9 particularly, wherein the movable casting on the columns 4, 5, and 6 at one side of the press, is seen to be substantially identical to that on the other set of columns 4, 5, and 6, spaced therefrom. These castings are connected in a manner to be set forth.

With the foregoing general elements of the press in mind, the drawings disclose a bolster 10 consisting of the spaced castings 11 and 12 mounted on and fixed to the columns so as to be vertically positioned with regard thereto, located intermediate the top and bed members 2 and 3. The bolster includes certain packing gland mechanism generally denoted 13 which will be described in detail subsequently. Arranged immediately above the bolster is a second forming support means 14, formed of spaced castings 15 and 16 of substantially identical form, said castings being connected together by an outer form unit 17 to be described in detail subsequently. This second forming support means is adapted to move upwardly and downwardly on the columns in a manner to be described.

Above the second forming support means, is a third forming support means 18, formed similarly to the means 14 and adapted to move upwardly and downwardly intermediate said support means 14 and the top member 2. The support means 18 includes the spaced castings 19 and 20 with intermediate connection by means of compression and insert part mechanism 21, to be described in greater detail hereinafter.

Below the bolster 10, the first forming support means generally denoted 22 is located and includes the spaced castings 23 and 24 which are adapted to support intermediate the same, the means to vibrate and oscillate a core member unit, these means to vibrate and oscillate being denoted 25 generally, with the core member unit being indicated at 26 generally and to be described in greater detail subsequently.

Figure 7:
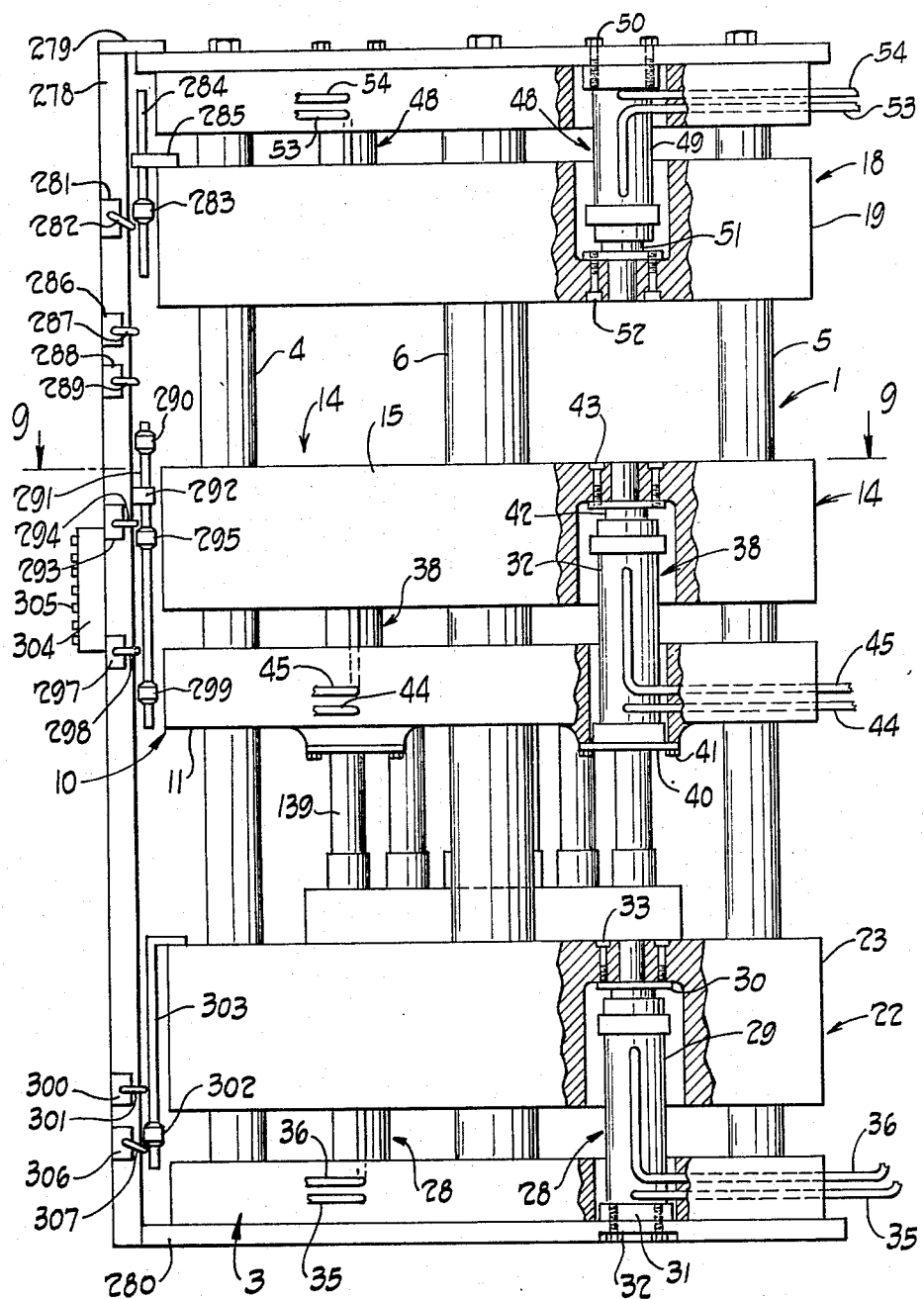
FIGURE 7 is a side elevational view of the machine, certain of the instrumentalities being omitted, and illustrating certain of the controls and operating means for the machine as well as constructional features thereof.

In order to effect movement of the respective units just hereinbefore referred to, certain hydraulic instrumentalities are provided in the form of piston and cylinder units, the arrangement of which is shown in somewhat greater detail in FIGURE 7, with that for the first forming support means 22 being indicated at 28 including the cylinder 29 with a piston 30 operating therein, this unit being arranged so that it is engaged by means of the lower portion thereof at 31 with bed member 3, suitable bolts 32 being supplied to secure the same to the bed member. Extending upwardly and inwardly within the casting 23 the piston 30 is connected by means of bolts 33 to the upper portion of the casting 23.

It will be understood that this piston and cylinder unit 28 is duplicated at the left, within the casting 23, the casting 24 being similarly equipped with duplicate piston and cylinder units therewithin, and designated 28'.

Suitable piping including an inlet pipe 35 is provided and connected at the lower end of the cylinder 29 with an outlet pipe so-called at 36 connected to the upper portion of the cylinder. The corresponding unit 28, that is the twin so to speak of the unit 28 just heretofore referred to will be similarly equipped with piping and inlet at 35 and outlet at 36, these being connected in a manner to be subsequently set forth in greater detail.

In order to facilitate the movement of the second forming support means 14, piston and cylinder units 38 are provided. Each unit 38 includes the cylinder 39 fixed at its lower end by means of the plate 40 and bolts 41 within the bolster casting 11, the upper portion extending upwardly into the casting 15, the piston 42 thereof being fastened by means of the bolts 43 and suitable associated means near the upper portion of said casting 15. The twin of this unit 38 is denoted similarly and arranged in the casting spaced therefrom on the other side of the column 6.

It will be appreciated that the casting 16 is similarly equipped with piston and cylinder units these being designated 38', for operation in a similar manner, each of these units having inlet pipe 44 with outlet pipe 45, the cylinders being connected together and directed to a suitable source of pressure and control in a manner to be described subsequently.

The third forming support means 18 is adapted to move upwardly and downwardly on the columns 4, 5 and 6, in a manner similar to the means 22 and 14 heretofore described in detail, this being effected by means of piston and cylinder units 48, the cylinder 49 thereof connected at its upper end by means of the bolts 50 to the top member 2, with the piston thereof connected at its lower end, this piston being denoted 51, by means of the bolts 52 to the casting 19 for example in any preferred manner. An identical piston and cylinder unit 48 is disposed on the other side of the column 6 and similarly connected to the respective castings 19 and 2, these cylinder units being in inverted position from those previously described for the first and second forming support means 22 and 14 respectively.

Suitable piping for inlet of hydraulic fluid at 53 is provided with outlet at 54, the comparable inlet and outlets 53 and 54 for the twin piston and cylinder unit 48 being likewise provided and connected to those just previously mentioned.

It will be appreciated that this arrangement is duplicated in the other columns 4, 5 and 6 at the opposite side of the press, the cylinder units being designated 48', so that interchangeability is possible, and simultaneous operation of these respective members will be likewise effected in a manner to be set forth under the control of instrumentalities to be subsequently described in detail.

In view of the symmetrical nature of the press hereof, and the fact that the material working instrumentalities which are carried by the symmetrical sides, are not in and of themselves rigid and of a nature to transmit forces uniformly, it has been found desirable to develop the unique hydraulic system hereof which will in effect cause simultaneous operation of both sides of the various material forming support means, that is the castings which comprise such material forming support means. To the foregoing end reference is made to the additional figures including FIGURES 10, 11 and 12, the FIGURE 10 disclosure relating to and showing the basic pumping unit and distribution of pressure and oil to the hydraulic elements previously suggested as comprising the power means for the first, second and third forming support means, namely the units 22, 14 and 18, with the piston and cylinder units 28, 28', 38, 38', and 48, 48' being operated thereby to effect movement of the respective units upwardly and downwardly on the columns 4, 5 and 6.

Referring therefore to FIGURE 10, there is shown a supply tank 55 which supplies hydraulic oil to a series of pumps, operated by an electric motor 56, the pumps being driven from opposite ends of the motor 56 by means of the shaft 57 for the left and 58 for the right hand series of pumps.

These pumps are duplicated as will be understood, being pumps 59, 60 and 61 on the left, the pump 61 being a high pressure pump as viewed in FIGURES 10 and 13, and 62, 63 and 64, the pump 64 being the high pressure pump, on the right in said figures.

The pressure from the high pressure pumps 61 and 64 may be in the order of 3000 lbs. per square inch, with oil flow in the range of 90 gallons per minute, the oil being directed through the circuit in the manner now to be described, from the pump 61 for example through the line 65, thence to the line 66 leading to what is called a spool valve arrangement generally denoted 67 and shown in greater detail in FIGURE 11.

Referring to FIGURE 11 therefore, it will be noted that at the right hand portion of said figure is a valve 68 and on the left a valve 69 being a substantial duplicate of the valve 68, these valves being operatively tied together by an adjustable connection indicated at 70 so that the spools thereof may be actuated simultaneously in a manner to be set forth hereinafter.

Basically the control of the motion of said valves is effected by the duplicate of the same indicated at 71 generally operated by limit switches through solenoids 72 and 73 which control the admission and flow of oil to the respective hydraulic piston and cylinder units hereinafter to be referred to specifically.

It will be noted that the valve 68 includes a spool 74 therein, engaging at one end with a piston 75 and at the other end with the adjusting unit 70 and specifically the part 76 thereof. The piston 75 is maintained in contact with the spool 74 by means of the admission of hydraulic fluid to the chamber 77 under the control of the solenoid valve 71 through the line 78. Correspondingly the valve 69, is provided with a spool 79 which in turn engages a piston 80 at one end and the adjusting unit 70 by means of a connection or part 81 at the opposite end, the part 81 being engaged with and adjustably related to the part 76 for operation in a manner to be subsequently set forth. The piston 80 is maintained against the spool 79 and the spool 79 in turn against the part 81 by means of the admission of fluid through the line 82 under the control of the valve 71 previously referred to. Thus there is constant pressure on both ends of the spools 79 and 74, by means of the pistons 80 and 75 respectively so that the position of the respective spools is maintained in a constant relationship even though there is no actual fixed connection thereof.

Control of the fluid flow to the piston and cylinder units 48 and 48′, is provided by shifting of the spools 74, 79, in accordance with generally conventional valve operation. However in this particular instance, the spools are compelled to operate simultaneously by the piping connections previously described, and likewise exactly the same distance so that the same quantity of fluid is admitted to the respective piston and cylinder units heretofore referred to.

It will be assumed that shifting the spools 74 and 79 to the left for example will provide for the flow of fluid to the lines 88, 88′. This would means that the cylinders are supplied through the outlets 85, 85′ for example. The spools 74, 79 are shifted to the left exactly the same amount, by reason of the actuation of the solenoid 73 which admits fluid through through the line 78 to the area 77, actuating the piston 75 thence through the adjustment 70 and the spool 79 for precisely the same distance. Should some difficulty be encountered that the units 48′ are for some reason not supplied with the same amount of fluid and at the same pressure as the units 48, since the units 48 are being supplied from the line 90 and thus the pump 64 in contrast to the units 48′ being supplied by the pump 61 through the line 66, this will in turn unbalance the shuttle valve 91 and thus shut the oil off from the unit 48. Until such time as an equalizing quantity of oil is supplied to the units 48′ no further motion of the units will take place. In other words the shuttle valve 91 must again become balanced so that an equal quantity of oil will be supplied from both the pumps 61 and 64.

It will thus be apparent that simultaneous motion of the castings 19 and 20 which comprise the basic supporting parts of the third forming support means 18, will be effected since the amount of hydraulic fluid admitted is very uniformly directed and under substantially uniform pressure otherwise no motion of any of the hydraulic instrumentalities just referred to will take place, because of the shuttle valve 91 and its connection through the spool valves 68 and 69.

It will be obvious from the foregoing that movement of the spool valves and particularly the spools 74, 79 to the right will direct fluid to the opposite ends of the piston and cylinder units 48, 48′ and particularly of course the pistons and cylinders thereof so that motion in the opposite direction is imparted to the castings connected to said piston and cylinder units. The same type of action or rather lack of action will be effected as previously described if one side of the press, that is one of the castings 19 or 20 tends to move faster or a different distance by reason of the attempt to accept more hydraulic fluid, unbalancing the shuttle valve 91 again.

It will of course be understood that the operation of the solenoid valve 71 by limit switches, in a manner to be explained subsequently, controls the basic flow and direction of flow of the oil to either end of the piston and cylinder unit so that motion upwardly and downwardly of the unit 18 is effected, this balancing of motion that is the simultaneous motion of the castings 19 and 20 being inherently provided for in this arrangement by reason of the shuttle valve 91 previously mentioned.

The piston and cylinder units 38 and 38′ are actuated in a similar manner by corresponding spool valve units 92, which include the spool valves 93 and 94, these are in turn connected by lines 95 and 96 respectively for supply, these leading from the lines 90 and 66 respectively to the said spool valves 93 and 94. From the spool valves 93 and 94 the hydraulic fluid is directed by means of lines 97 and 98 and 97′ and 98′ to the lines 44 and 45 and 44′ and 45′, with a comparable solenoid valve 71 being provided for actuation of the spool valves under control of limit switches likewise to be explained subsequently.

It will also be understood that the shuttle valve 91 will effect the uniform operation of the piston and cylinder units 38 and 38′ in a manner similar to the units 48 and 48′ previously described, that is if one of the castings, 15 for example, moves faster than the casting 16 or over a greater distance, then the shuttle valve is actuated, reversing the direction or limiting the motion of the spools of the spool valves 93 and 94 so that oil flow is in turn controlled and if necessary reversed, or stopped to prevent any destruction of the various instrumentalities carried by the castings 15 and 16.

A comparable arrangement for the operation of the piston and cylinder units 28 and 28′ is provided, these units likewise being supplied by the lines 90 and 66 respectively by way of supply to spool valves 101 and 102 of the spool valve unit 103 generally indicated, the spool valves 101 and 102 including an adjusting arrangement such as the member 70 shown in FIGURE 11. It is therefore understood that manipulation of the solenoid control valves for these respective spool valves, will cause simultaneous movement thereof and likewise the shuttle valve 91 will also control such simultaneous movement so that there is no possibility of misalignment of the castings 23 and 24 which are operated by the hydraulic units 28 and 28′.

Suitable piping such as the line 105 will be connected to the line 35 for example, the line 36, being connected to a line 106. The corresponding lines for the piston and cylinder units for the other casting 24 for example will be indicated by the line 35', 36' connected repectively to lines 105' and 106'.

Suitable back pressure valves are provided for the lines 87 and 87', indicated at 87a and 87b, comparable valves being provided in the lines 98 and 98', being indicated at 98a and 98b respectively. Like back pressure valves for the units 35 and 35' are indicated at 106a and 106b. These back pressure valves eliminate air pockets and restrict the flow of return oil to the storage tank or supply tank provided therefor through the drains 106c and 87c, these leading to the tank 55 as shown in FIGURE 10 for example.

The importance of the equalization of the movement of the respective press portions is emphasized, and specifically the castings which comprise these press portions, namely castings 23 and 24, 15 and 16, and 19 and 20, all of which are moved simultaneously in pairs as has been previously emphasized.

An equalizer unit 110 indicated in FIGURE 13 is connected by suitable supply lines such as 111 and 112 to the shuttle valve through intermediate piping, the shuttle valve being indicated at 91 as has previously been mentioned, so that if one set of cylinders for the castings 23, 24 for example and specifically for the casting 23 stops, the shuttle valve will move shutting oil off from the cylinders for the castings 24. This is the so-called first forming support means and denoted by the piston and cylinder units 28 and 28'. Since the oil is shut off any movement of the shuttle valve would in turn cause movement of the spool valve unit associated therewith, that is associated with its particular piston and cylinder unit or units whereby to maintain the simultaneous movement of these units or in any event prevent non-simultaneous movement.

This is an important consideration when in addition it is borne in mind that a pair of these spool valves is operated by a single solenoid unit so that if one such unit as 71 is or becomes inoperative, nothing will move in that particular unit and therefore no destructive strain is set up by such movement which might occur under other circumstances and in other machines which are not provided with this novel arrangement of interlocking hydraulic operation.

Additional hydraulic instrumentalities will be referred to as required in the further description of this press, since they operate instrumentalities which are necessary for certain types of material being worked by said press but these will be specifically mentioned at the time that the instrumentalities are described in further detail.

The broad general operating phases of the press having been suggested, the specific means for manipulating material such as concrete for the manufacture of concrete pipe or tile, will be next described since this will bring out certain additional instrumentalities which are required for this type of operation and require description relating thereto, as well as providing a basis upon which the description of the control means for all of the instrumentalities heretofore described can be set forth.

With the foregoing in mind therefore, reference is again made to FIGURES 1 and 5 particularly, wherein the first forming support means 22, is provided with core means, this entire unit including the castings 23 and 24 being intended to move upwardly and downwardly on the columns 4, 5 and 6 as has previously been suggested.

In any event connecting or spanning the space between the castings 23 and 24 is a bottom support member 115 which is suitably fastened at its edges to the respective castings as by means of bolts denoted 116, there being supported on and above it a suitable vibrating and oscillating unit denoted 25 generally and including a housing 118 of generally rectilinear configuration. Within the housing is supported a crankshaft member 119 in bearings 120 and 121 at opposite ends, these bearings in turn being arranged in eccentrics 122 and 123 respectively so that adjustment of the throw of the crankshaft 119 may be effected. The shaft 119 is connected to an electric drive motor 124 by a coupling 125, the motor being supported on the member 115.

It will be apparent therefore that the crank 119 operates in housing 118 which is actually a crank case which includes a top 126 through which extend connecting rods 127 and 128, upwardly, the lower ends of the connecting rods being supported on journals 129 and 130 respectively of the shaft 119.

The connecting rods 127 and 128 are in turn connected to a shaft 131 which extends between bearings 132 and 133, said bearings being in turn fixed to a plate 134 and beneath the same, the plate 134 being guided for upward and downward movement between the castings 23 and 24 by means of piston and cylinder units more particularly shown in FIGURE 1 and denoted 135, there being four of these provided one at each corner of the plate 134.

The plate 134 is limited in its upward movement by a pair of stop members 136 and 137, fastened by suitable bolts such as 138.

It will be apparent therefore that by operation of the motor 124, the shaft 119 will be rotated, the connecting rods 127 and 128 will be moved upwardly and downwardly carrying with them the plate 134 and in turn anything supported by the plate, in this case comprising a series of core members denoted 139 and consisting of eighteen such members, the lower ends of the same being fixed to a suitable support 140 which in turn is fastened by the legs 141 to the plate 134.

These core members 139 are cylindrical and provided with collars 142 at their lower ends, the upper ends being generally hemispherical as indicated at 143.

By means of the hydraulic piston and cylinder units 28 and 28', the castings 23 and 24 move upwardly and downwardly as a unit carrying with them this vibrating and oscillating means 25, this unit as such comprising the first forming support means previously mentioned. The extent of movement of this unit will be controlled by certain control means to be subsequently described when the other forming support means and the balance of the instrumentalities for forming concrete pipe or tile have been described.

Referring therefore to FIGURE 1 again, the next portion of the press to be described is the bolster which consists of the castings 11 and 12 fixed to the columns 4, 5 and 6 at opposite sides of the press, these castings in turn supporting the packing gland mechanism 13 previously mentioned. The packing gland mechanism 13 consists of a series of packing glands in the form of short, or relatively short collar or sleeve-like parts 144, there being one of these for each of the core members 139, these collar-like parts being equipped with flanges 145 at their lower ends.

Figure 5:
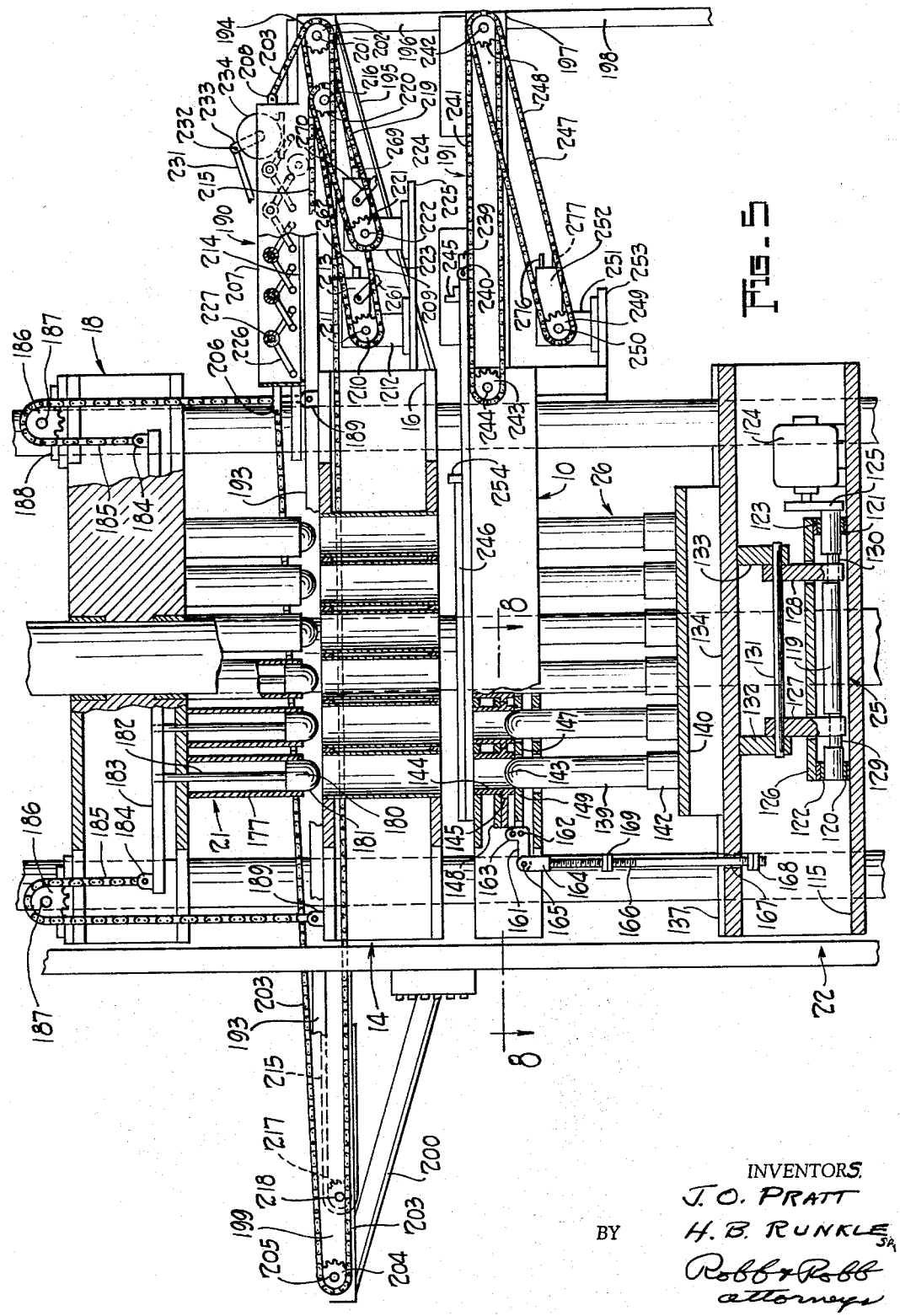
FIGURE 5 is a side view, somewhat fragmentary in nature, likewise largely in section, illustrating other instrumentalities in the apparatus and their relationship to the entire machine.

The parts 144 are mounted in a packing gland rotating unit shown in fragmentary detail in FIGURE 8 and generally denoted 146. This unit 146 comprises a main body 147 upon which the members 144 are supported for rotation, being maintained in position as indicated in FIGURE 5 by suitable retaining parts 148 located above the flanges 145, and adapted to maintain the sleeve or collar-like parts 144 in contact with bearings 149 of relatively large diameter, the inner diameter of the bearings being substantially the same inner diameter as the parts 144. These bearings are in the form of thrust bearings and are supported on the bottom of the member 146 so that the glands are rotatable thereon.

In order to rotate the sleeves or packing glands 144, the mechanism shown in FIGURE 8 is availed of and includes the longitudinally movable operating rods 150 and 151. The rods 150 are in turn equipped with the upstanding circular parts 152, these parts engaging mating notches 153 formed in the flanges 145.

One hundred eighty degrees from the notches 153 are additional notches 154 which are engaged by smaller parts 155 in turn mounted on the rods 151.

The ends of the rods 150 and 151 are connected to a lever 156 by means of the pivots 157 and 158, this lever 156 being in turn mounted on a support 159 for pivotal movement at 160. Thus pivotal movement of the lever 156 in one direction will move the rods 150 inwardly for example and the rods 151 outwardly concurrently therewith. The engagement of the parts 152 and 155 with the flanges 145 will cause a rotative movement to be imparted to the packing glands or sleeves 144.

It will be noted that this is a simultaneous movement, the rotation of certain of the glands being effected in one direction and those adjacent in an opposite direction simultaneously.

In order to effect the movement of the lever 156, a bell crank 161 is provided pivoted at 162 and engaging the rod 150 at 163. The other end of the bell crank 161 is connected to a yoke 164 by a pivot 165, and extending downwardly from the yoke is a threaded connecting rod 166, the lower end of the connecting rod extending through an opening 167 in plate 134.

In order to provide for adjustment of the rod 166, nuts 168 are provided at the lower end and intermediate said nuts and the connection with the yoke 164 are a pair of stop nuts 169. The stop nuts 169 are adapted to engage the upper surface of the plate 134 during appropriate movement of the said plate in an upward direction so as to in turn impart rotation in a clockwise direction to the bell crank 161 and thereby cause movement of the lever 156 and thus in turn impart rotative motion to the packing glands 144.

By the same token, the movement of the plate 134 which is effected when the first forming support means 22 moves downwardly, engaging the nuts 168, will cause opposite movement of the bell crank lever 161 to position the same for subsequent movement upon impingement of the plate 134 with the nuts 169.

It should be noted that the entire packing gland unit 13 and the mechanism thereof moves upwardly by reason of the engagement of the collars 142 with the bottom of the unit, this being only a limited motion during the forming operation to be subsequently described. A plate 170 which extends between the castings 11 and 12 of the bolster herein just described, is beneath the packing gland mechanism.

The next part of the press to be described is the second forming support means, which includes the outer form unit 17 previously mentioned, this outer form unit comprised essentially of a series of tubular members of identical form and size denoted 171, these members being engaged at their lower ends in a plate 172 fastened to the castings 15 and 16 by means of the bolts 173. Suitable formations of the castings 15 and 16 facilitate the connection so as to occupy the position about as shown in FIGURE 1 for example, the plate 172 extending over the area between the castings and being rigidly engaged therewith.

At the upper ends of the cylindrical members 171, which are also called outer form members, is a plate 174 substantially identical to the plate 172, form members 171 being fixed thereto and arranged so as to provide a series of cylindrical passageways for purposes to be subsequently set forth, the plate 174 being fastened to the castings 15 and 16 by bolts 175, the castings being formed to provide for mounting of the plate 174 in the manner disclosed in the said FIGURE 1.

As will be noted from the FIGURE 1 disclosure and also in the other figures, the core members 139 are adapted to move within the outer form members 171 so as to be spaced somewhat therefrom and provide the thickness of the tile or pipe by such spacing. That is the wall thickness of the pipe is determined by the spacing of the core members 139 with respect to the outer form members 171.

The third forming support means 18 is a mechanism similar to the second forming support means, and supports the compression and insert part mechanism 21 which consists of a series of tubular parts 177 suitably fixed at their upper ends to a plate 178, which plate 178 is in turn fastened to the lower portions of the castings 19 and 20 by means of suitable bolts 179, the castings being formed to receive the plate 178 so as to occupy the position shown about in FIGURE 1.

Referring now to FIGURE 5 particularly, the tubular parts 177, also called compression parts, are of a size that they will fit within the outer form members 171 previously described. These compression parts 177 are intended under operating conditions to move within the outer form members 171 and are of about the same thickness as the wall of the pipe or tile to be formed in the press.

Adapted to operate within the compression parts 177 are the insert members 180, being relatively rudimentary cylindrical parts having hemispherical ends 181 thereon, the cylindrical parts 180 in turn being connected with operating rods 182, these latter at their upper ends being fastened to an operating plate 183.

The operating plate 183 is in turn connected at four points by means of suitable ears 184 extending upwardly therefrom with suitable chains 185 which extend upwardly over sprockets 186 which are in turn mounted on shafts 187 so as to be rotatable with respect thereto, the shafts 187 in turn being carried by the pillow blocks 188.

The chains 185 extend downwardly to connections at 189 with the upper surface of the second forming support means 14. Movement of the second forming support means 14 when the third forming support means 18 is at rest will obviously cause movement correspondingly of the inserts 180 and likewise when the second forming support means 14 is at rest and the third forming support means 18 is moved, movement of the inserts 180 will likewise be effected, all in accordance with the sequence of operation to be subsequently set forth.

Having thus described the various forming aspects of the press for the manufacture of concrete tile or pipe, in order to supply the necessary aggregate to the forms, certain additional mechanism is required and in this instance includes a feed drawer unit generally denoted 190 and a pallet unit generally denoted 191.

The feed drawer unit 190 is carried by the second forming support means 14 and includes as indicated in FIGURES 1 and 5 the tracks 192 and 193, which at the right hand side of the machine as viewed in FIGURE 5 are supported by suitable structural members in the form of channels or the like, and indicated at 194, these in turn being braced by suitable channel members 195 which are fastened to the casings 15 and 16 at their ends. At their extremities where members 194 and 195 join, there extend downwardly therefrom suitable legs 196 adapted to engage at their lower ends with additional channel support members 197 of the pallet unit 191, and these in turn being supported by the legs 198 extending to the surface upon which the press as a whole is mounted.

The tracks 192 and 193 extend over the top of the plate 174 and at the left hand side of the press as viewed in FIGURE 5 extend outwardly therebeyond on channels 199 which are in turn braced by channels or angles 200, these members 199 and 200 being connected at their inner ends to the castings 15 and 16 in any preferred manner.

It will be understood that the tracks 192 and 193 are spaced so that a relatively wide track overall is provided, the tracks extending as viewed in FIGURE 1 at the outside of the outer form members 171. This will likewise indicate that the channels 194 and 199 are likewise similarly spaced in order to support the track. Extending transversely between the channels 194 is the shaft 201 upon which is drivably mounted, a sprocket 202 about which a chain 203 is reeved, the chain 203 in turn extending to and through the machine around a sprocket 204 carried by a shaft 205 extending between the channels 199, the chain in turn extending back through the machine to a connection at 206 with the feed drawer 207, the chain 203 at the opposite end of the feed drawer being connected at 208. It will thus be understood that if the sprocket or shaft 201 upon which the sprocket 202 is mounted is rotated, in one direction the feed drawer 207 will move from right to left or vice-versa depending upon its position and under the motive power now to be described.

Suitably mounted also on the shaft 201 is further sprocket over which is reeved the chain 209, this chain engaging at its inner end so to speak with a further sprocket 210 which is driven by a shaft 211. The shaft 211 is in turn rotated by a speed reducer 212 driven by a motor 213, this being an hydraulic motor obtaining its motive power in a manner to be subsequetly set forth.

It should be noted that the feed drawer 207 is basically, as viewed in plan, a rectangular box-like member having a bottom 214 adapted to slide in guides 214a with respect to the drawer 207 for purposes to be explained, the manner of operating this bottom now to be explained and comprising a chain 215 reeved over a sprocket mounted on a shaft 216, being an endless chain extending through the machine over a further sprocket 217 mounted on a shaft 218 carried by the channels 199, the shaft 216 being carried by the channels 194.

The chain 215 is adapted to be driven by an endless chain 219 which is reeved over sprocket 220 carried on the shaft 216 and drivably connected thereto, the chain being further reeved over another sprocket 221 drivably connected to a shaft 222, this being driven by a speed reducer 223 which is operated by an hydraulic motor 224 in a manner to be subsequently set forth. The speed reducers and motors 212, 213 and 223 and 224 are carried on a suitable base 225 fastened in any preferred manner to the structure provided by the channels 194 and beneath the feed drawer as shown in the position of FIGURE 5.

The drawer bottom 214 is essentially a flat plate and arranged, in the sequence of operations, to be moved with respect to the feed drawer 207 to permit material carried therewithin to drop downwardly into the forms 171 as required by the sequence of operation to be set forth subsequently.

Figure 6:
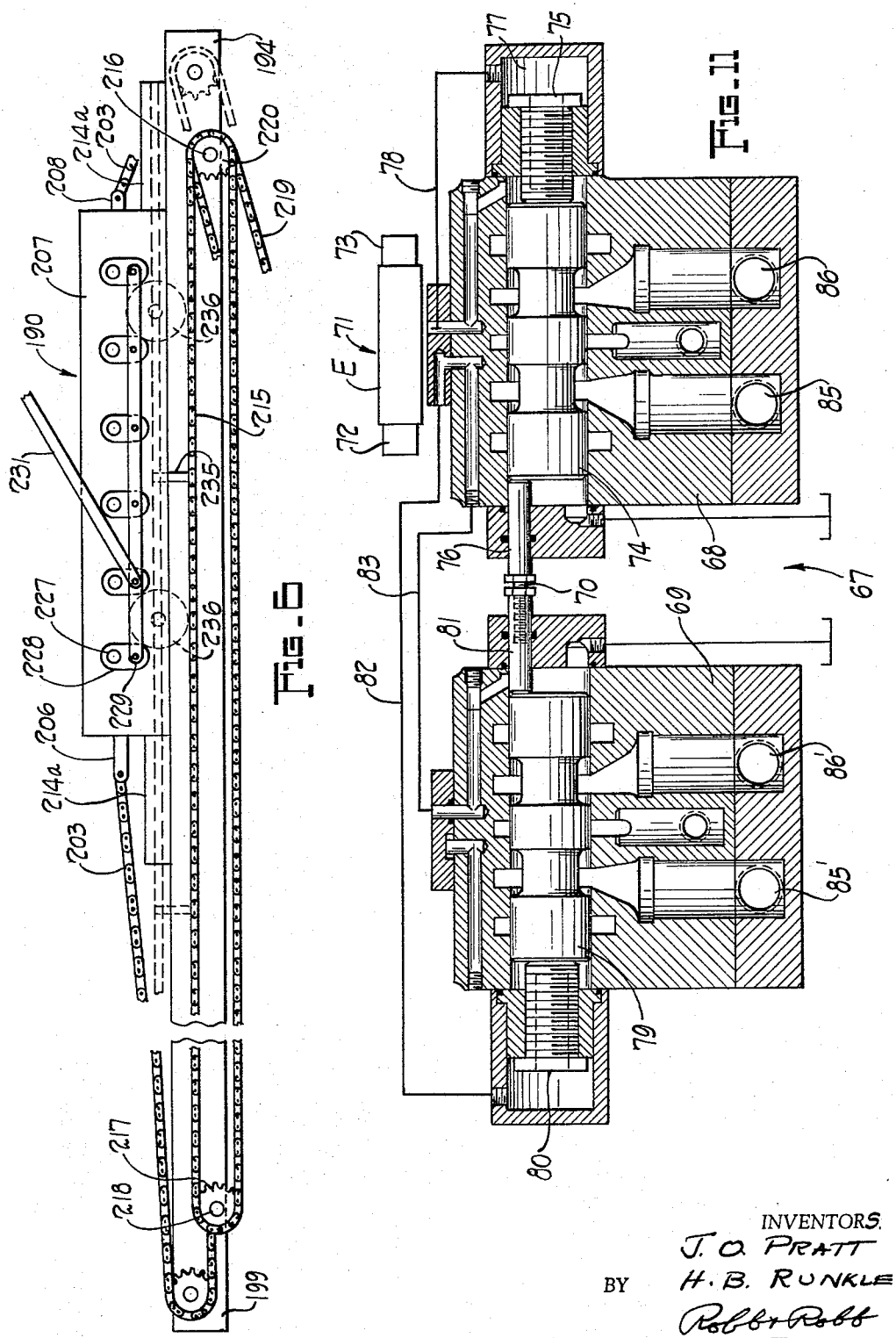
FIGURE 6 is a fragmentary view, partly in section, showing in further detail certain of the feed drawer instrumentalities of FIGURE 5.

Aggregate is deposited in the feed drawer 207 in the position shown in FIGURE 5, and the feed drawer in proper sequence moves leftwardly as viewed in said figure to carry the aggregate into the press and above the outer forms 171. It is noted that since aggregate will have a tendency to bridge or otherwise not move downwardly through the feed drawer 207 when the bottom 214 is operated, suitable means are provided to agitate the material and cause the same to move as required, these comprising a series or arm members 226 mounted on shafts 227 extending transversely of the feed drawer 207 and drivably connected to said shafts. At the outer side of the feed drawer as indicated in FIGURE 6, the shafts 227 are in turn connected with arms 228, these being pivotally connected at 229 to a longitudinally extending member 230. The member 230 is in turn connected to a drive rod 231 which is connected at one of the pivots 229 with the member 230 and at the other end at 232 with a crank 233 drivably operated by a motor 234 and the motor being controlled so as to effect this movement of the members 226, the motor being mounted on the feed drawer about as indicated in FIGURE 1.

Reference is made to FIGURE 6 for the details just heretofore described, this figure likewise showing in somewhat greater detail the manner of connection of the drawer bottom 214 with the drive chain 215, this being effected by a downwardly extending lug 235 fastened to the lower surface of the drawer bottom 214 and connected to the chain 215.

Suitable rollers 236 mounted on the outer faces of the sides of the feed drawer 207 support the drawer for movement along the tracks 193 and 194. When the feed drawer is to be operated, aggregate is dropped into the same, supported on the bottom 214, the drive motor 213 operated, effecting movement of the chain 203, drawing the feed drawer to the left as viewed in FIGURE 5 and positioning the same above the outer form members 171. Subsequently the drawer bottom 214 is moved to the right for example, permitting the drawer to be opened and the aggregate within the same to drop downwardly into the forms in the proper sequence as will be explained, after which the feed drawer bottom is moved to the left. Thereafter the feed drawer 207 is moved bodily to the right to its position as shown in FIGURE 5 so that subsequent manipulation of the aggregate previously dropped into the forms may be effected.

Reference is made to FIGURE 5 again to describe the pallet mechanism which is supported by the bolster 10, and extending outwardly to the right as viewed in FIGURE 5, consisting of the spaced channels 197 previously mentioned, and a pallet carrier 239, the pallet carrier 239 being connected by a lug 240 to a chain 241 reeved over a sprocket mounted on a shaft 242, the chain further being engaged with a sprocket 243 carried on a shaft 244.

The pallet carrier 239 comprises essentially a frame from the upper surface of which a stop 245 extends, this stop being arranged to engage with a pallet such as 246 this being in the form of a rectangular plate about ¼ or ⅜ inch in thickness and of suitable size to support the tile or pipe thereon in a manner to be subsequently set forth.

In order to move the pallet carrier 239 through its reciprocating movement, a suitable chain 247 is provided reeved over a sprocket 248 drivably connected with the shaft 242 and thus with the chain 241 first described, and in turn carried on a sprocket 249 drivably connected to a shaft 250 which extends from a gear reducer 251, the gear reducer and motor 251, 252 being supported on a suitable support 253 extending from the bolster 10.

Thus when the pallet carrier 239 is in its fully retracted position, that is moved fully to the right as viewed in FIGURE 5, a pallet may be dropped thereonto, and the part 245 engages the same, causing it to be moved to the left as viewed in said figure into the position shown in full lines therein. The pallet carrier is then retracted a suitable dog 254 having been rocked into position to prevent withdrawal of the pallet 246, during the retraction of the carrier 239.

It is appropriate at this point to describe the hydraulic drive and connections for the feed drawer and pallet carrier as well as the drawer bottom member. For this purpose reference is made to FIGURE 13 particularly, which shows similar spool valve units to those first described provided for the purpose, the feed drawer spool valve unit being denoted 256, operated by the solenoids 257 and 258. The spool valve units are single units to regulate the movement of the feed drawer. Connections such as 259 and 260 extend to the tank and to the high pressure pump 61 respectively with the feed drawer being operated by means of connections 261 and 262 to the hydraulic motor 213.

A further spool valve 264 is provided for the hydraulic motor 224 which operates the feed drawer bottom 214. Lines 265 and 266 extend from the valve to the tank and high pressure pump 61 respectively with solenoids 267 and 268 being furnished to manipulate the valve 264 to admit fluid through the lines 269 and 270 which are connected to the hydraulic motor 224.

In order to manipulate the pallet unit and drive the hydraulic motor 252 therefor, the further spool valve 271 is provided controlled by solenoids 272 and 273 receiving operating fluid and pressure from the pump 64 through the line 274 and in turn dumping into the tank by the line 275.

The lines 276 and 277 lead to the motor 252 and are arranged to operate the same under the controls to be subsequently set forth.

Reverting now to a consideration of FIGURE 7, the control instrumentalities are shown as comprising a series of switches mounted on a suitable column 278 extending vertically alongside the press and being fastened thereto at 279 and to the base at 280. The column 278 includes a switch 281 at the upper portion thereof actuated by a lever 282 which engages with a stop member 283 adjustably mounted on a vertically extending rod 284 connected to an arm 285 so as to move with the third forming support means 18 in accordance with a sequence to be subsequently described in detail.

Just below the switch 281 is another switch 286 from which extends an operating arm 287, a further switch 288 being provided just below that previously mentioned including an arm 289 extending therefrom. The switch 288 and arm 289 associated therewith are operable by an adjustable part 290 mounted on the upper end of a vertical member 291 which is fixed to the second forming support means 14 and denoted 292. A switch 293 is mounted on the column 278 including an arm 294 adapted to engage an adjustable operating member 295 carried on the rod 291 previously referred to.

Arranged below the switch 293 is a further switch 297 mounted on the column and having an arm 298 extending therefrom adapted to engage with an adjustable part 299 mounted on the member 291 previously mentioned.

A switch 300 is proved on the lower portion of the column having an operating arm 301 extending therefrom adapted to engage an adjustable part 302 on a vertically extending rod 303 fastened to the first forming support means 22. Switch 306 actuated by arm 307 is provided to reset the sequence of operation to be described.

Actuation of the various switches upon movement of the respective forming support means by means of the members such as 283, 290, 295, 299 and 302 causes each sequential operation to be effected under the control of a master control panel 304 having the necessary relays therein, these all being connected to the various relay actuators or switches previously mentioned.

In order to effect operation of the press, one of the buttons in the panel 304 may be suitably actuated, these various buttons such as 305 being arranged to control individual press operations in both directions, that is upwardly and downwardly so that manual manipulation of the press may be resorted to, an automatic system being provided to effectuate the sequence now to be described in detail.

Assuming that the parts of the press are substantially in the relationship disclosed in FIGURE 5, manipulation of the control panel 304 by a button such as 305 will cause the automatic sequence to be set into motion, this in turn causing first of all the first forming support means 22 to move upwardly. As it does so, it will set in operation the oscillating and vibrating means 25 as by the switch 300, the core members 139 carried on the means thereafter reaching the position about as shown in FIGURE 1 interiorly of the outer form members 171 and spaced therefrom.

The second forming support means 14, next move downwardly enough to position the packing glands 144 at the lower ends of the openings provided between the outer forms 171 and core members 139.

Thereafter the feed drawer 207 moves to the left as viewed in FIGURE 5 carrying with it the aggregate. When the feed drawer is positioned above the outer form members 171, the drawer bottom 214 is withdrawn permitting the aggregate to drop downwardly within the members 171 and around the cores 139. It should be remembered that the vibration and oscillation of the core members 139 is taking place, causing the aggregate to settle downwardly around the same and the arms 226 are in rocking motion.

The bottom 214 is then returned to its bottom closing condition and the feed drawer 207 is withdrawn to the position shown in FIGURE 5 in full lines.

Subsequent this operation, the compression parts 177 carried by the third forming support means 18 are moved downwardly so that they begin to enter the upper ends of the space around the core members 139. The inserts 180 remain about in the position shown in FIGURE 5 as the compression parts 177 continue their downward motion, and simultaneously as the compression parts reach the lower point of their movement, the second forming support means 22 is moved slightly upwardly so that the packing glands 144 in conjunction with the compression parts 177 exert a compressive force at both ends of the aggregate which is now in the form of a tubular part or pipe around the core members 139.

Thereafter, the vibrating and oscillating motion of the core members 139 is stopped, and the core members 139 commence to move downwardly to withdraw from the interior of the now formed concrete pipe or tile. When the first forming support means 22 reaches its lowest extent of movement, it will contact units 168 on the rod 166, moving the bell crank lever 161 and rotating the packing galnds 144 so that the upper ends of the packing glands are released from pressure contact with the lower ends of the now formed concrete tile in the forms 171.

With the cores 139 now completely withdrawn from their positions within the concrete tile thus formed, and the second forming support means 14 having moved upwardly sufficiently, the pallet 246 will move into place by the pallet carrier 239. Thereafter the third forming support means 18 is caused to continue its downward movement thus becoming a stripping unit with the parts 177 engaging the upper ends of the now formed tile or pipe, and the inserts 180 moving into the ends of the now formed tile to provide means to prevent crushing the upper ends of the tile. By further downward movement of the third forming support means 18, the tile is forced outwardly from the second forming support means 14 and particularly of course the outer form units 171 thereof.

Figure 4:
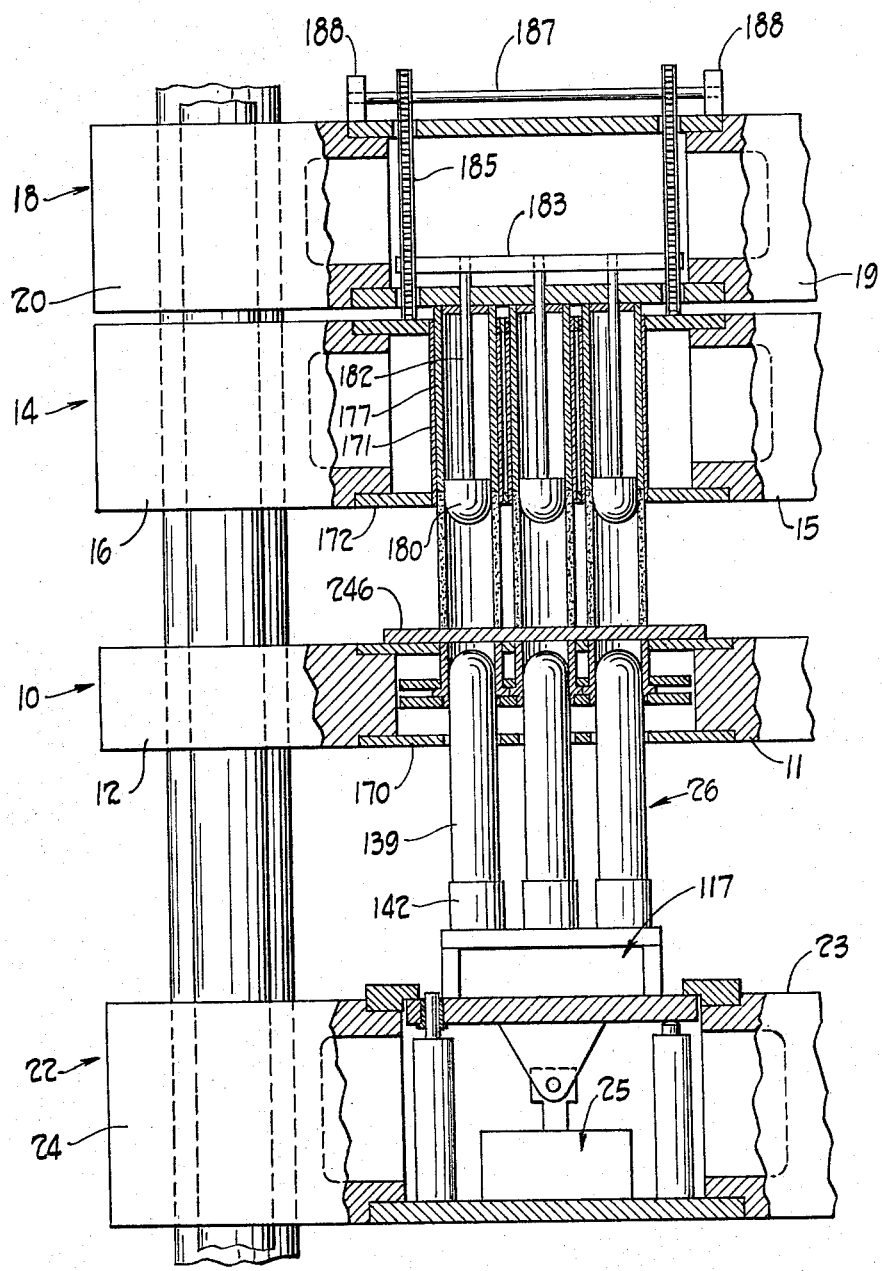

When the tile are stripped from the forms 171 onto the pallet 246, the press will have assumed the general condition indicated in FIGURE 4 and thereafter the second forming support means 14 is completely withdrawn from engagement with the tile, the third forming support means 18 likewise returning to the position of FIGURE 1. This will also withdraw the inserts 180.

Subsequently the pallet carrier 239 is again actuated. This time the ends of the carrier engage the pallet 246, as carrier 239 moves to the left, moving the tile supported on the pallet and the pallet outwardly through the press to any convenient means for carrying the same away.

It will thus be understood that a complete cycle of all of the mechanism hereinbefore described has taken place under the control of the various switches and relays mentioned. Further in the automatic operation only sequential movement of the various parts is possible since if one sequence of operation is not completed, none of the following sequences can be started. These movements are dependent on the complete on-off operation of the switches such as 281, 286 and others.

The control means are necessarily properly electrically connected in a manner which will be understood by those skilled in the art when the sequences have been specifically pointed out as has been the case here.

While the various sequences of operation have been explained in conjunction with the manufacture of concrete pipe or tile and specifically of course involving the use of core members, outer forms, stripping members, compressing means, and other instrumentalities described in detail, it will also be appreciated that by reason of the various provisions of first, second and third forming support means, that manipulation of other types of material may be resorted to, specifically in the metal forming art for example.

In the metal forming art certain individual elements of those herein described are found but no prior press has been provided with forming support means and operated in the manner herein described, it being further remembered that by reason of the symmetrical arrangement of the various elements of this press, the same may be extended widthwise so as to comprehend a much greater number of parts and the manufacture thereof, whether the same be in the concrete tile or related fields. In other words, by spacing the columns 4, 5 and 6 a greater distance from the like columns, and suitably arranging the mechanism located therebetween, as carried by the various means and their operating elements, a vastly increased production quantity may be effected and as a matter of fact stages in various operations on metal for example may be likewise accommodated in the same press and to be manipulated at the same times as those taking place and explained herein.

It is also apparent that different sequences of movement of the respective parts may be resorted to so that the press hereof is extremely versatile and provides novel instrumentalities particularly relating to the hydraulic drive means therefor, the symmetrical nature of the press, the ability to produce multiples of any particular material and perform a series of differing operations where required or found desirable.

An important feature of the arrangement hereinbefore described, and particularly in relation to the core member unit 26, is the ability to adjust this unit vertically and to time its movement in the cycle so that when the feed drawer 207 is in position to drop the aggregate into the forms, the core members 139 can be at any given position vertically within the tubular members 171. It will be apparent that by maintaining the cores at a position say half-way up in the tubular members or outer forms 171, substantially more aggregate can be deposited in the drawer than would otherwise be the case if the core members 139 were fully raised within the outer core members 171. Thus when the aggregate is distributed from the drawer and around the core members 139, if they are in fact relatively low so to speak within the members 171, continued movement of the core members 139 upwardly thereafter with the vibratory action taking place will provide for a substantially greater amount of material to be confined within the members 171 and thus the tile formed thereby, to be much more dense than would be the case if the members 139 were substantially higher in the members 171 before the aggregate was deposited. There is thus an ability to regulate the density to be provided in the concrete tile formed hereby, and this will of course apply to other concrete and similar products made in the machine and determined by the timing relationship and movement of the various elements hereof as heretofore suggested.

It is also notable that by adjusting the appropriate stop, the packing glands 144 may be contacted by the collars 142 in such a manner that the oscillating vibrating action imparted to the core members 139 will be in turn imparted to the glands 142 and thus assist in the compacting operation. This is a question of timing as will be understood and positioning of the various switches or more particularly the switch actuating stop members such as 283 and the like so that they contact the appropriate switch. In this case the member 299 contacting the switch 297 would earlier initiate the vibratory action and in turn vibrate or oscillate and tamp the material in the forms by contact of the collars 142 with the packing glands 144 corresponding thereto. This feature is in addition to the final squeezing compacting action which takes place according to the timing of the various mechanisms hereof in the final movement of the various parts in the tile forming operation.

This same kind of action can be availed of in the formation of other than tile products, so long as the type of action is desirably to be provided, this being suscep- tible of adjustment in varying degrees as will be readily understood.

It is also pointed out that the period of time over which the vibration and tamping or oscillating action may take place in respect of the unit 25, can be varied within relatively wide limits and thus additionally control the density of the final products being formed herein.

By consideration of FIGURE 5, it will be seen that under some circumstances it might be desirable for the feed drawer 207 to pass through the press, and out to the left hand side thereof as viewed in said figure so that it could be in turn supplied with aggregate from the left hand side for articles being made within the press. This would of course reduce the lost motion time and increase the efficiency of operation of the machine as a whole if found desirable or necessary. This will be effected with the disclosure herein as stated by providing for timing of the cycle of operation of the feed drawer 207 accordingly and for movement of the same over a greater distance as would be necessary to e:ectuate this end.

While the description heretofore given has been based upon the arrangement of this press to form tile, it will be readily understood that other concrete products or products made of a similar material or dissimilar materials which are desirably compressed or formed by manipulation such as can be effected in this press may likewise be availed of to provide various final finished products which desirably have their raw materials manipulated in the manner provided hereby.

We claim:

1. In a press of the class described, in combination, a frame including a bed member, a top member spaced therefrom, common column means connecting said members, a bolster fixed on said frame intermediate said members, first forming support means on said frame intermediate said bolster and bed member, second and third forming support means on said frame intermediate said bolster and top member, positive means directly connected to said bed member to move said first support means toward and from said bolster, positive means directly connected to said bolster and said top member respectively to move said second and third support means respectively toward and from said bolster and top member respectively, instrumentalities to control the movements aforesaid, said column means extend vertically between the bed and top members, and the forming supports are movable vertically thereon.

2. The combination as claimed in claim 1, wherein the first support means include upwardly movable core members, the second support means include outer form members, the third support means include compressing parts, and the instrumentalities are arranged to move the core members into place in the outer form members and the compressing parts compress material between the core members and the compressing parts.

3. The combination as claimed in claim 1, wherein the second support means include outer form members, packing glands are located in the bolster positionable within the form members, aggregate supply means are provided to deposit aggregate within the form members, core elements are movable into the form members by the first forming support means, the third support means include compressing parts opposed to the packing glands, and the means to move the first and third forming support means toward the bolster cause material in the outer form members to be compressed from the ends toward the middle thereof.

4. The combination as claimed in claim 3, wherein means are provided to transmit vibratory action to the core elements, whereby the density of material in the outer form members is increased.

5. The combination as claimed in claim 3, wherein the aggregate supply means comprise a feed drawer unit, said unit is movable into position above the outer form members, said feed drawer is provided with aggregate agitating means, and the compressing parts are arranged to facilitate the positioning of form retaining means therewithin, whereby the material is compressed between the packing glands and parts aforesaid.

6. The combination as claimed in claim 1, wherein the first support means is provided with a core member, means are provided to vibrate and oscillate said member, the bolster supports a packing gland through which the core member is extensible, the second support means includes an outside form in alignment with the packing gland and adapted to receive a formable material therein, the third support means includes a compressing part in alignment with the packing gland aforesaid, means are provided to deposit the formable material in the outside form, and the control means regulates the power means whereby the core member is caused to move upwardly through the packing gland, the outer form downwardly around the core member, the compressing part downwardly to engage material in the form and against the packing gland whilst said gland is moved upwardly, and thereafter the outer form to move upwardly around the compressing part, said compressing part thereby forcing material compressed in said form downwardly therefrom.

7. The combination as claimed in claim 6, wherein means are provided to rotate the packing gland after material is compressed in the outer form, pallet positioning means are arranged to position a pallet under the material forced from the form, and an insert is carried within the compressing part to enter the opening formed by the core member whilst said part is forcing the compressed material from said outer form.

8. The combination as claimed in claim 7, wherein a feed drawer unit is carried by the second support means and includes a drawer adapted to reciprocate to and from a position over said outer form, said drawer being suitable to carry the formable material therein and deposit the same in the form aforesaid.

9. The combination as claimed in claim 1, wherein all the forming support means comprise pairs of column engaging members, and central sections for supporting work performing parts, said central sections being removably connected to all said members, said engaging members being of substantial vertical height, hydraulic piston and cylinder units are provided to effect movement of all support means, said piston and cylinder units being arranged to lie substantially within the column engaging members in fully retracted condition, whereby the overall height of the press is maintained at a minimum.

10. The combination as claimed in claim 9, wherein the power means includes means to supply fluid power in precisely equal quantities to operate the piston and cylinder units to move each pair of column engaging members simultaneously into all positions within the range thereof.

11. In a press of the class described, in combination, a frame comprised of a bed member, a top member and column means extending therebetween, a bolster fixed to the column means intermediate the bed and top members, a first forming support means mounted on the columns between the bolster and bed member, core elements carried by the first support means, means to oscillate said elements vertically, a second forming support means mounted on said columns above the bolster, outer form members fixed to the second support means and movable therewith, means to supply aggregate to the form members, third forming support means mounted on the column means and movable intermediate the top member and the second support means, compressing parts on said third means, and means to actuate all of said means, whereby aggregate is compressed between the elements and the outer form members.

12. The combination as claimed in claim 11, wherein the column means extend between the ends of the top and bed members, the top and bed members are constructed to facilitate varying the spacing between the column members, and the forming support means are similarly constructed to coincide with said members.

13. The combination as claimed in claim 11, wherein the bolster is provided with a packing gland for each core member, the glands are movable in the direction of and by movement of said core members, means are provided for said members to impart such movement, and other means are provided to rotate said packing glands.

14. The combination as claimed in claim 11, wherein insert means are carried by the third support means, and include parts movable within the compression parts and in alignment with the cores adapted to enter the spaces from which the cores are withdrawn.

15. The combination as claimed in claim 11, wherein the compressing parts are arranged to force formed aggregate from the outer forms.

16. The combination as claimed in claim 11, wherein the means to supply aggregate to the form members comprises a feed drawer unit carried by the second support means, means to move the feed drawer unit to and fro over the outer forms, means to open said drawer to facilitate deposit of aggregate in the forms, and means to agitate aggregate in said drawer.

References Cited by the Examiner
UNITED STATES PATENTS

| | | | |
|---|---|---|---|
| 2,152,569 | 3/1939 | Root et al. | 25—45 |
| 2,168,075 | 8/1939 | Stokes | 25—41 X |
| 2,192,474 | 3/1940 | Kissam | 25—41 |
| 2,308,132 | 1/1943 | Wellmitz. | |
| 2,586,210 | 2/1952 | Corwin. | |
| 2,651,180 | 9/1953 | Haller | 18—16 X |
| 2,675,581 | 4/1954 | Payne | 25—91 X |
| 2,717,435 | 9/1955 | Livingston et al. | |
| 2,810,929 | 10/1957 | Willi | 18—16.7 |
| 2,825,092 | 3/1958 | Hatch et al. | 18—16.7 |
| 2,859,502 | 11/1958 | Brown | 25—41 |
| 3,118,176 | 1/1964 | Freeman et al. | 18—5 |
| 3,158,898 | 12/1964 | Northrup et al. | 25—103 X |

J. SPENCER OVERHOLSER, *Primary Examiner.*

J. HOWARD FLINT, *Examiner.*